(12) United States Patent
Alzner et al.

(10) Patent No.: US 8,118,284 B2
(45) Date of Patent: Feb. 21, 2012

(54) COLLECTOR-DISTRIBUTOR COMBINATION

(75) Inventors: Gerhard Alzner, Munich (DE); Ludwig Bauer, Baierbrunn (DE)

(73) Assignee: Linde Aktiengesellschaft, Munich (DE)

( * ) Notice: Subject to any disclaimer, the term of this patent is extended or adjusted under 35 U.S.C. 154(b) by 882 days.

(21) Appl. No.: 12/109,893

(22) Filed: Apr. 25, 2008

(65) Prior Publication Data

US 2008/0271983 A1    Nov. 6, 2008

(30) Foreign Application Priority Data

Apr. 26, 2007 (DE) .......................... 10 2007 019 816

(51) Int. Cl.
*B01F 3/04* (2006.01)
(52) U.S. Cl. .................... 261/97; 261/114.1; 261/114.2; 261/114.5
(58) Field of Classification Search .................... 261/97, 261/114.1, 114.2, 114.5
See application file for complete search history.

(56) References Cited

U.S. PATENT DOCUMENTS 3,232,590 A * 2/1966 Eckert .............................. 261/97
3,290,024 A   12/1966 Huber

FOREIGN PATENT DOCUMENTS

| DE | 195 26 153 A1 | 1/1996 |
| DE | 103 52 294 A1 | 6/2005 |
| EP | 0 878 221 A1 | 11/1998 |
| GB | 2 277 888 A | 11/1994 |

* cited by examiner

*Primary Examiner* — Robert A Hopkins
(74) *Attorney, Agent, or Firm* — Crowell & Moring LLP

(57) ABSTRACT

A collector-distributor combination in a column, which is filled with a random packed bed or with a structured packing, is disclosed. The liquid phase is guided over a collector with inclined planes to a central opening, which is connected to an ascending pipe, from which the liquid phase is distributed to the plane underneath via the distributor pipes. By guaranteeing a constant filling level of the liquid phase in the ascending pipe, the distributor functions as a pressure distributor. The liquid phase is distributed independent of the inclination of the column over the entire length of the distributor pipes. The gaseous phase passes through the collector via the chimney.

21 Claims, 3 Drawing Sheets

COLLECTOR-DISTRIBUTOR COMBINATION

This application claims the priority of German Patent Document No. 10 2007 019 816.9, filed Apr. 26, 2007, the disclosure of which is expressly incorporated by reference herein.

BACKGROUND AND SUMMARY OF THE INVENTION

The invention relates to a collector-distributor combination for a gaseous and a liquid phase in a column.

Columns filled with a random packed bed or with a structured packing have numerous application possibilities in plants for the petrochemical industry. Frequently, these types of columns are used to separate blends, wherein a gaseous phase is withdrawn via the head of the column and a liquid phase via the base of the column. The random packed beds and the structured packings in the interior of the column are used to improve the interaction between the gaseous and the liquid phase. As a result, for optimal functional capability of the column, the liquid phase as well as the gaseous phase must be distributed uniformly over the entire volume and thus over the entire cross section of the column.

A column according to the prior art has one or more collector and distributor devices, which are distributed over the entire column. In the prior art these types of columns are used mainly on land in so-called on-shore operation. In this type of column according to the prior art, the liquid collector and distributor are designed as a rule as open channels, troughs or bus bars.

Liquid collectors and distributors according to the prior art are distributed over the entire height of the vertically aligned column and installed horizontally. The liquid phase wets the random packed beds or the structured packings, with which the column is filled and flows downward driven by gravity. The gaseous phase moves upwards. Due to the fact that both phases are forced to move through a plurality of narrow channels, the interaction between the two phases is increased. According to the prior art, a liquid collector and distributor is situated between two of these types of packing levels. The liquid drips by virtue of gravity into the collector, is conveyed from there to the distributor and in the distributor is distributed over the entire cross section of the nearest packing level. According to the prior art, these types of distributors are frequently designed as open channels (U profiles) with holes, which distribute over the entire cross section of the column. The intermediate space between the open channels is used for the passage of the gaseous phase. In order to keep the liquid phase out of these passages, the passages in the prior art are frequently covered over. These liquid distributors, which function according to the principle of an open gravity distributor, have been proven in the use of land-based, vertically aligned columns.

The liquid collectors and distributors described in the prior art are not appropriate for use under off-shore conditions like those prevalent on a ship, for example. In off-shore operation, the column is subjected to continuous movement, which takes it out of its vertical orientation. In the most adverse case, an inclined position of several degrees of the column with respect to the vertical can occur over a longer period of time. With this type of use of open gravity distributor systems according to the prior art, it is possible, when the column is in an inclined position, for the liquid not to reach the lowermost point of the collector and distributor system, thereby causing the packing body/packing to be only insufficiently wetted, and thus making it impossible for the column to continue to fulfill its function.

The present invention is therefore based on the objective of designing a collector-distributor combination in such a manner that collecting and distributing the gaseous and the liquid phases is guaranteed even in the case of an inclined position of several degrees of the column.

The present objective is attained in that the distributor for the liquid phase is designed as a pressure distributor for the liquid phase and/or the collector for the liquid phase is designed as a pressure distributor for the gaseous phase.

Because of the inventive design of the distributor as a pressure distributor, distribution is guaranteed independent of gravity and the inclined position of the column. The embodiment as a pressure distributor puts the liquid phase and/or the gaseous phase under pressure in such a way that the respective phase disperses over the entire distributor. As a result, the respective phase gets distributed over the entire cross section of the column. An accumulation of the respective phase in one area of the cross section of the column is avoided. The pressure in the distributor makes sure that the respective phase is distributed against gravity over the entire cross section of the column even when the column is not aligned vertically.

In a preferred embodiment of the collector-distributor combination, the collector for the liquid phase has means, which are suitable for guiding the liquid phase to a central opening, which is connected via an ascending pipe to the distributor for the liquid phase. The ascending pipe expediently has a polygonal, preferably rectangular, or round, preferably oval, particularly preferably circular, cross section, which is suitable in terms of its size to permit gas bubbles to ascend against the flow of the liquid phase. The distributor for the liquid phase is comprised advantageously of at least one distributor pipe connected to the ascending pipe, from which distributor pipe at least one other distributor pipe can branch off, wherein the distributor pipes have any polygonal or round cross section and openings for the liquid phase on the underside.

Above all, inclined flat surfaces are suitable as means for guiding the liquid phase to a central opening in the collector. In this case, the flat surfaces advantageously have an incline that is considerably greater than the expected maximum inclined position of the column. Therefore, even with a maximum inclined position of the column, a residual slope still remains in the collector, through which the liquid phase is conveyed to the central opening. Independent of the inclined position of the column, the liquid phase is guided to the distributor system with the distributor pipes through the ascending pipe connected to the central opening. The dimensioning of the ascending pipe should be selected in such a way that, on the one hand, the possibility exists for gas bubbles within the liquid distribution system to rise through the ascending pipe, and, on the other hand, for a continuous fill level of the liquid phase to be guaranteed in the ascending pipe. Because of the continuous fill level of the liquid phase in the ascending pipe, pressure builds up over the entire distributor system made up of the ascending pipe and distributor pipes, and the pressure guarantees distribution of the liquid phase over the entire length of the closed distributor pipes and thus over the entire cross section of the column. The pressure in the distributor system distributes the liquid phase even against gravity. The distributor pipes of the distributor are expediently distributed uniformly over the entire cross section of the column. The liquid phase exits uniformly on the entire cross section of the nearest packing level through the openings on the underside of the distributor pipes.

Advantageously, the collector for the liquid phase is suitable as a collector and distributor for the gaseous phase. The collector for the liquid phase expediently has at least one chimney for the gaseous phase, wherein the chimney has any polygonal or round cross section and a cap going beyond the cross section of the chimney or a hood going beyond the cross section of the chimney. It is particularly preferred that several chimneys be distributed uniformly over the surface of the collector for the liquid phase.

Because of the preferred embodiment of the collector for the liquid phase as an inclined surface over the entire cross section of the column, the gaseous phase accumulates beneath the collector. The gaseous phase can pass through the collector only via the chimneys distributed over the cross section. The loss in pressure, which the gaseous phase experiences by flowing through the chimneys, makes for uniform distribution of the gaseous phase beneath the next higher packing section. The collector for the liquid phase thus serves advantageously as a pressure distributor for the gaseous phase. Because of advantageously equipping of the chimneys with caps or hoods, which go beyond the cross section of the chimneys, penetration of the liquid phase into the chimneys is prevented and the chimneys are thereby kept open for the gaseous phase.

In another embodiment of the invention, the distributor for the liquid phase is comprised of a flat, closed cylinder with openings for the liquid phase on the underside, wherein the basic surface of the cylinder extends over the entire cross section of the column and the cylinder has at least one chimney passing through it for gas passage. Also in this embodiment of the distributor as a flat, closed cylinder, the distributor functions as a pressure distributor and the liquid phase is distributed over the entire cross section of the column. In order to simultaneously guarantee the permeability of the distributor for the gaseous phase, analogous to the collector, the distributor has one or more chimneys distributed uniformly over the cross section.

In a further embodiment of the invention, the collector for the liquid phase has means, which guide the liquid phase in parts to a central opening, which is connected via an ascending pipe to the distributor for the liquid phase, and to guide the liquid phase in parts to an opening on the outside of the column, through which a specific quantity of liquid can be guided out of the column in a dosed manner. In this embodiment of the invention, the ascending pipe expediently goes beyond the central opening of the collector.

In numerous applications it is necessary to guide liquid out of the column in a defined quantity at various points over the height of the column. In this embodiment of the invention, this is advantageously combined with the collector for the liquid phase. The collector is constructed in such a way that the liquid phase is guided to two points, the central opening and the lateral withdrawal point for the liquid phase. In this case, a bowl-like indentation in the collector is expediently located on the lateral opening of the column. The distribution of the amount of the liquid phase between the central opening and the lateral opening for discharging the liquid phase is regulated in this case by the height by which the ascending pipe goes beyond the central opening of the collector.

In particular, the present invention makes it possible to guarantee uniform distribution of the liquid and gaseous phases in a column over the entire cross section of the column even when there is movement of the column or if it is set up with an inclination with respect to the vertical position.

The invention will be explained in greater detail in the following on the basis of three exemplary embodiments of the collector-distributor combination.

DETAILED DESCRIPTION OF THE DRAWINGS

Figure 1:
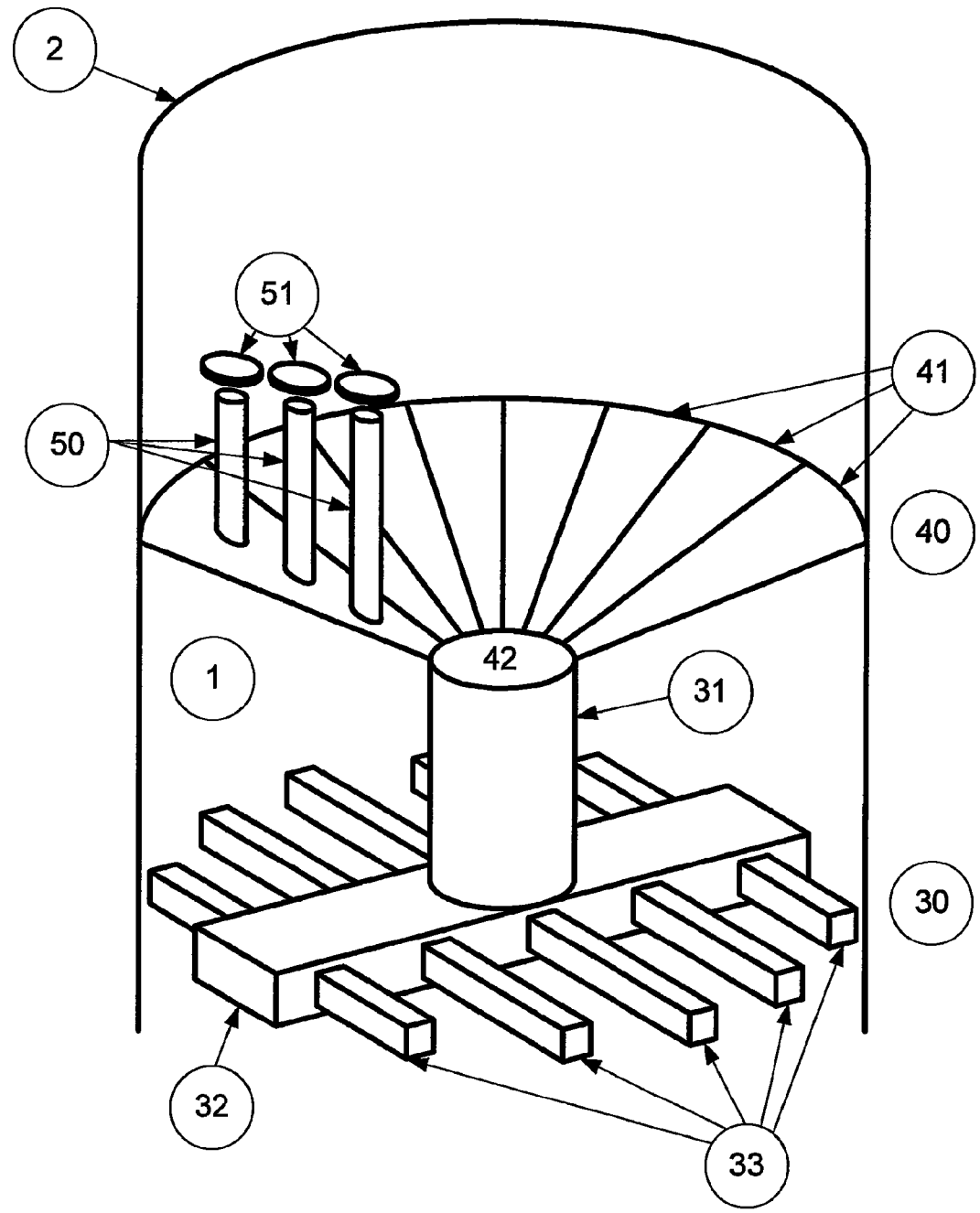
FIG. 1 illustrates an embodiment of the collector as a funnel.

FIG. 1 shows an embodiment of the inventive collector-distributor combination 1 in a column 2. The liquid exits from the upper packing level and meets the collector 40 that is composed of several segments 41 and forms the shape of a funnel. The inclination of the segments 41 with respect to the horizontal is such that even with a maximum inclined position of the column 2 a slope is produced at each point of the collector 40. The liquid phase is guided through the collector 40 to the central opening 42. The collector 40 is connected at the central opening 42 to an ascending pipe 31, which is connected with a central distributor pipe 32 having several additional distributor pipes 33. The distributor pipes 32, 33 are distributed over the entire cross section of the column 2 and have openings distributed on the underside also over the entire cross section of the column 2. The dimensions of the ascending pipe 31 and the distributor pipes 32, 33 are selected in such a way that a permanent fill level of the liquid phase in the ascending pipe 31 is produced in combination with the cross section of the openings of the distributor pipes 32, 33. Because of the permanent fill level of the liquid phase in the ascending pipe 31, the liquid phase in the entire distributor system made up of ascending pipe 31 and distributor pipes 32, 33 is permanently under pressure. As a result of this, the liquid phase is distributed over the entire length of the distributor pipes 32, 33 independent of the inclination of the column 2 with respect to the vertical and thus exits uniformly through the openings on the underside of the distributor pipes over the entire cross section on the packing body/packing layer underneath. The gaseous phase flowing from the bottom to the top between the distributor pipes 32, 33 accumulates beneath the collector 40 and permeates it by means of the chimneys 50. The chimneys are distributed (not shown) over the entire cross section of the collector 40 and equipped with a cap 51 in order to prevent penetration of the liquid phase from the upper packing body or packing layer into the chimneys provided for gas passage. The loss in pressure, which the gaseous phase experiences by flowing through the chimneys 50, in combination with the caps 51, makes for uniform distribution of the gaseous phase over the entire cross section of the column 2.

Figure 2:
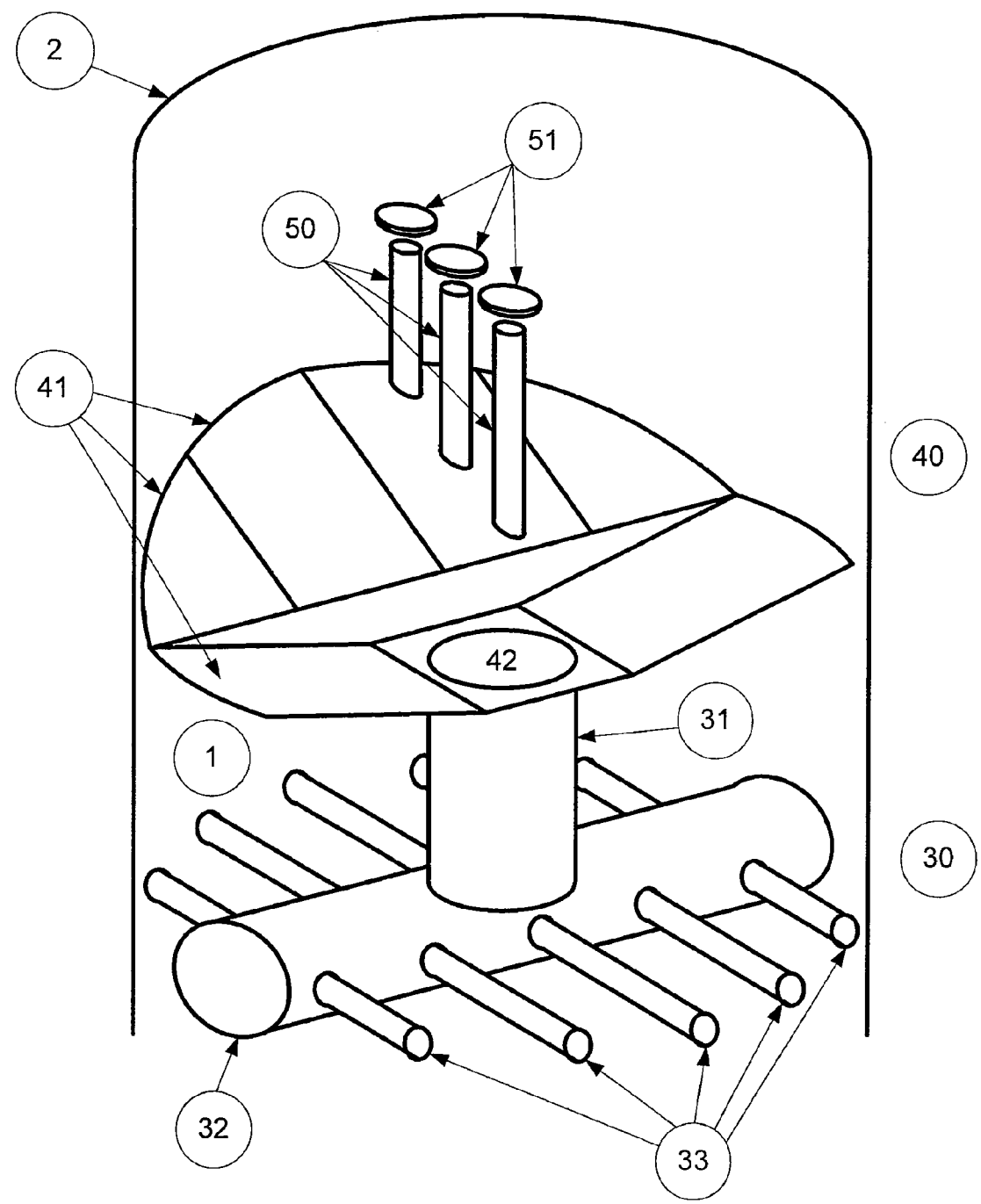
FIG. 2 illustrates an embodiment with a collector made of several inclined planes.

FIG. 2 shows another embodiment of the inventive collector-distributor combination. In this embodiment of the invention, the inclined planes 41 of the collector 40 are combined in such a way that a rectangular shaft is formed over the central opening 42. The distributor pipes 32, 33 of the distributor 30 have a round cross section in this embodiment.

Figure 3:
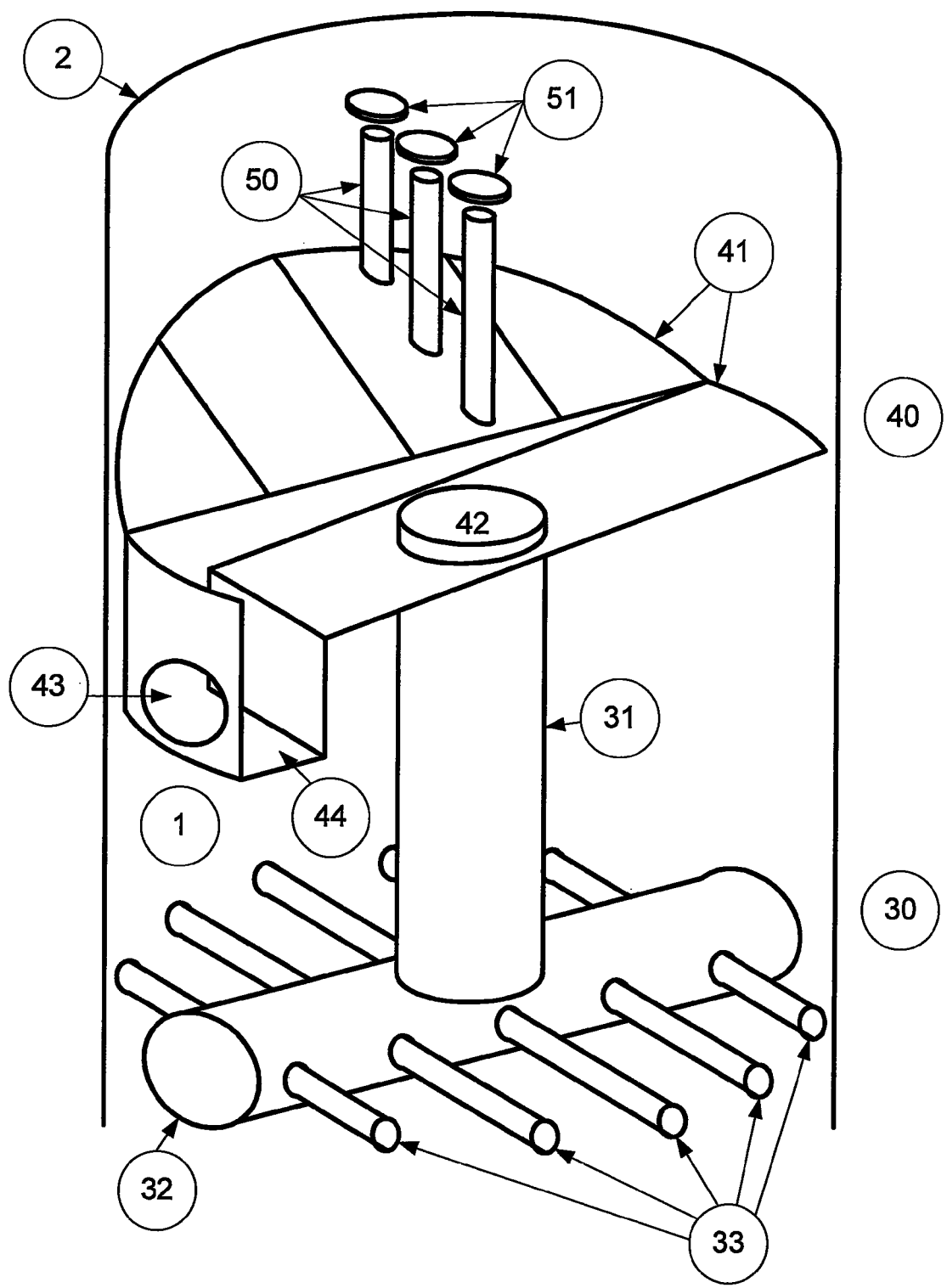
FIG. 3 illustrates an embodiment of the collector-distributor combination with a lateral opening for discharging the liquid phase.

FIG. 3 shows an embodiment of the invention, which has an opening on the outside of the column for dosed discharge of the liquid phase. The inclined planes 41 of the collector 40 are arranged in such a way that the liquid phase is guided to both the central opening 42 as well as to the lateral opening 43. Located at the opening 43 to the lateral discharge of the liquid phase from the column 2 is a rectangular shaft 44 in order to guarantee permanent availability of the liquid phase at the lateral opening 43. The inclined planes 41 form a rectangular shaft in the center of the cross section, in which the two openings 42, 43 lie. The quantitative distribution of the liquid phase to the two openings 42, 43 can be adjusted by the height, by which the ascending pipe 31 projects over the central opening 42. Also in this embodiment of the invention, the collector 40 and the distributor 30 are dimensioned in such a way that a continuous fill level of the liquid phase in the ascending pipe 31 is guaranteed. Therefore, the distributor 30 also functions as a pressure distributor in this embodiment of the invention and it is guaranteed independent of the inclination of the column 2 that the liquid phase is distributed over the entire length of the distributor pipes 32, 33.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A unitary collector-distributor combination for a gaseous phase and a liquid phase in a column, the combination collecting and distributing both the liquid phase and the gaseous phase, wherein the distributor for the liquid phase is designed as a pressure distributor for the liquid phase and the collector for the liquid phase is designed as a pressure distributor for the gaseous phase.

2. The collector-distributor combination according to claim 1, wherein the collector for the liquid phase has means for guiding the liquid phase to a central opening, which is connected via an ascending pipe to the distributor for the liquid phase.

3. The collector-distributor combination according to claim 2, wherein the ascending pipe has a polygonal or round cross section which has a size that permits gas bubbles to ascend against a flow of the liquid phase.

4. A collector-distributor combination for a gaseous phase and a liquid phase in a column, wherein the distributor for the liquid phase is designed as a pressure distributor for the liquid phase and/or the collector for the liquid phase is designed as a pressure distributor for the gaseous phase, wherein the collector for the liquid phase has means for guiding the liquid phase to a central opening, which is connected via an ascending pipe to the distributor for the liquid phase, and wherein the distributor for the liquid phase is comprised of at least one distributor pipe connected to the ascending pipe, from which distributor pipe at least one other distributor pipe branches off, wherein the distributor pipes have a polygonal or round cross section and openings for the liquid phase on an underside.

5. The collector-distributor combination according to claim 1, wherein the collector for the liquid phase is a collector and distributor for the gaseous phase.

6. The collector-distributor combination according to claim 1, wherein the collector for the liquid phase has at least one chimney for the gaseous phase, wherein the chimney has a polygonal or round cross section and a cap going beyond a cross section of the chimney or a hood going beyond the cross section of the chimney.

7. The collector-distributor combination according to claim 6, wherein several chimneys are distributed uniformly over a surface of the collector for the liquid phase.

8. A collector-distributor combination for a gaseous phase and a liquid phase in a column, wherein the distributor for the liquid phase is designed as a pressure distributor for the liquid phase and/or the collector for the liquid chase is designed as a pressure distributor for the gaseous phase, wherein the distributor for the liquid phase is comprised of a flat, closed cylinder with openings for the liquid phase on an underside, and wherein a surface of the cylinder extends over an entire cross section of the column and the cylinder has at least one chimney passing through it for gas passage.

9. A collector-distributor combination for a gaseous phase and a liquid phase in a column, wherein the distributor for the liquid phase is designed as a pressure distributor for the liquid phase and/or the collector for the liquid phase is designed as a pressure distributor for the gaseous phase, and wherein the collector for the liquid phase has means for guiding the liquid phase in parts to a central opening, which is connected via an ascending pipe to the distributor for the liquid phase, and for guiding the liquid phase in parts to an opening on an outside of the column, through which a specific quantity of liquid is guidable out of the column in a dosed manner.

10. The collector-distributor combination according to claim 9, wherein the ascending pipe goes beyond the central opening of the collector.

11. A column, comprising:
a collector disposed within the column and having an inclined surface;
a distributor disposed within the column; and
an ascending pipe coupled to the collector and the distributor.

12. The column according to claim 11, wherein the ascending pipe is coupled to the collector at a lowest most point of the inclined surface.

13. The column according to claim 11, wherein a chimney is disposed on the inclined surface.

14. The column according to claim 11, wherein the inclined surface is a funnel.

15. The column according to claim 11, wherein the inclined surface is comprised of a plurality of inclined planes.

16. The column according to claim 11, wherein the collector and the distributor extend over an entire cross section of the column.

17. A method for collecting and distributing a liquid and a gas in a column, comprising the steps of:
collecting the liquid in a collector disposed within the column, wherein the collector has an inclined surface;
directing the liquid from the collector to an ascending pipe by the inclined surface;
flowing the liquid through the ascending pipe to a distributor;
maintaining a level of the liquid in the ascending pipe;
distributing the liquid from the distributor; and
passing the gas through the collector via a chimney.

18. The method according to claim 17, wherein the step of maintaining the level of the liquid in the ascending pipe forms a pressure on the liquid in the distributor.

19. The method according to claim 17, further comprising the step of forming a pressure by the gas on an underside of the collector.

20. The method according to claim 17, wherein the collector and the distributor extend over an entire cross section of the column.

21. A collector-distributor combination for a gaseous phase and a liquid phase in a column, wherein the distributor for the liquid phase is designed as a pressure distributor for the liquid phase and the collector for the liquid phase has an inclined surface and is designed as a pressure distributor for the gaseous phase.

* * * * *